Figure 1:
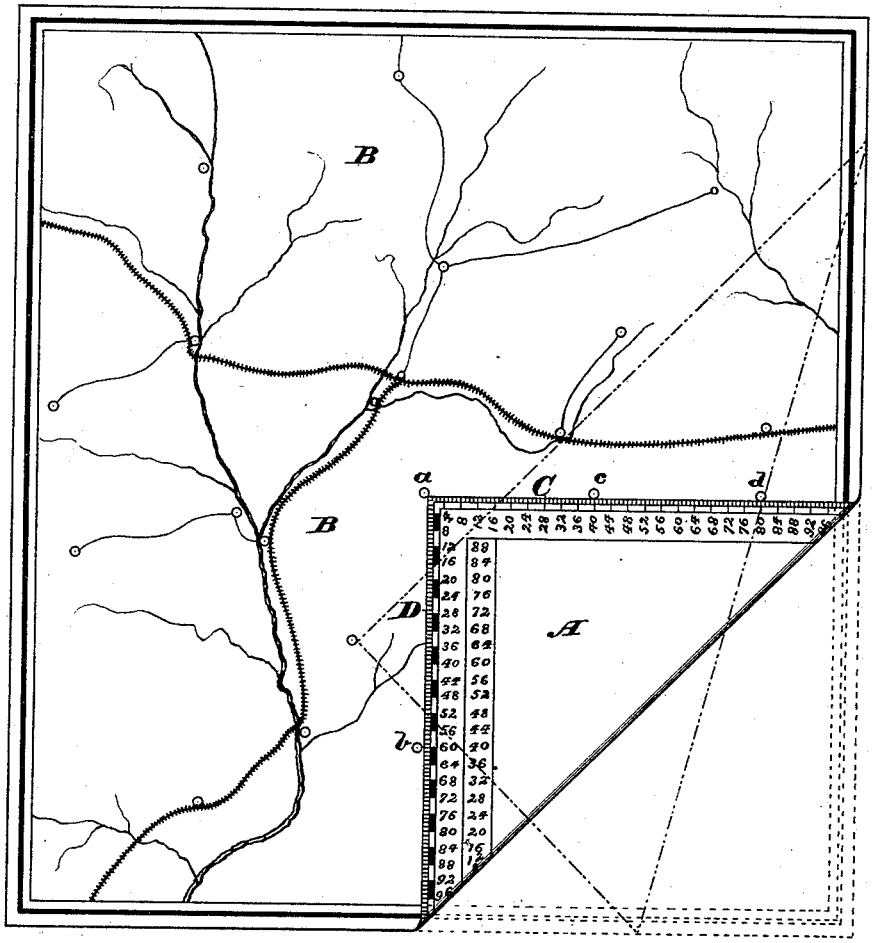

S. E. GROSS.
Map.

No. 232,261.

2 Sheets—Sheet 1.

Patented Sept. 14, 1880.

Attest:
W. L. Baker
C. B. Barker

Inventor:
Samuel E. Gross

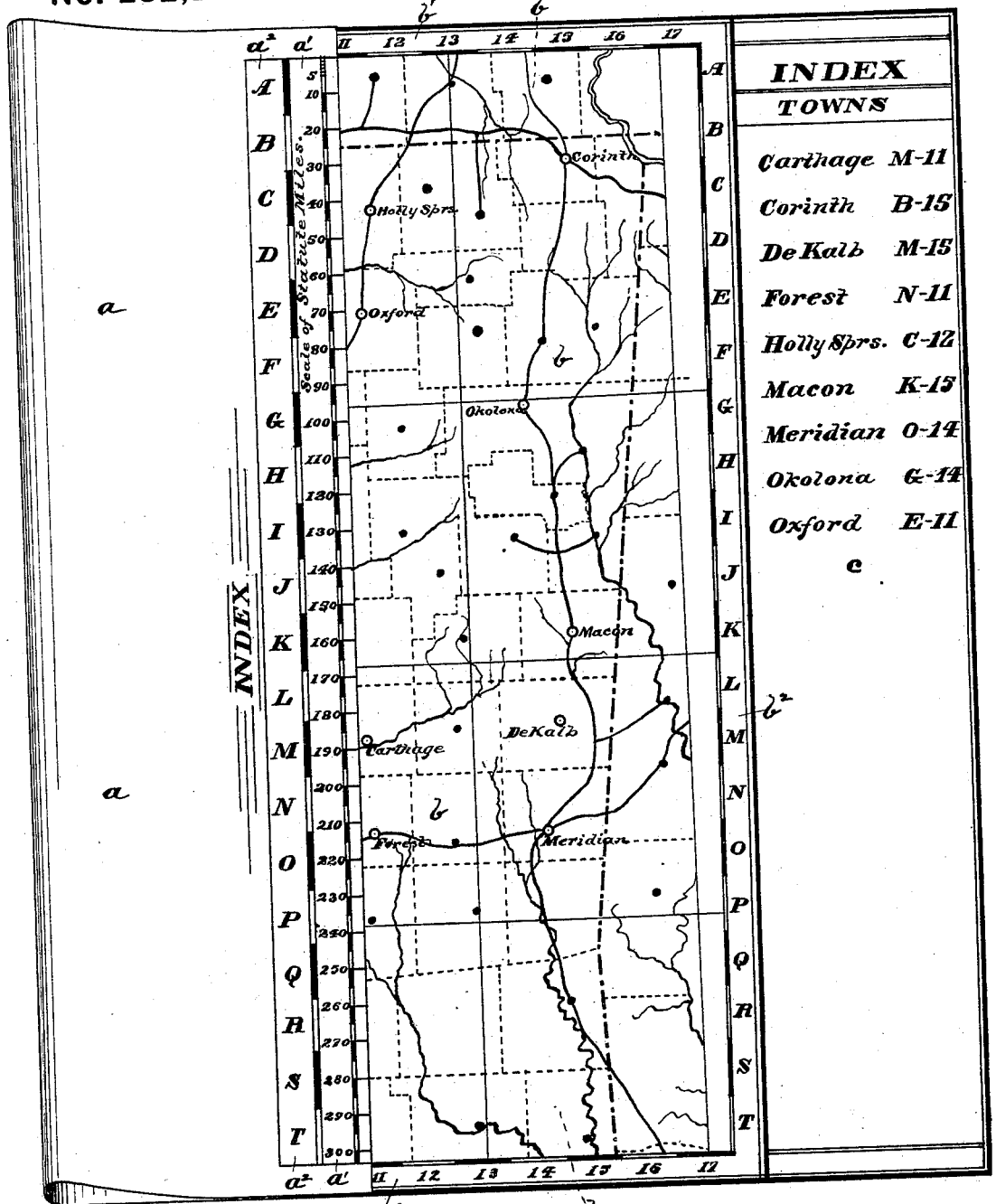

UNITED STATES PATENT OFFICE.

SAMUEL E. GROSS, OF CHICAGO, ILLINOIS.

MAP.

SPECIFICATION forming part of Letters Patent No. 232,261, dated September 14, 1880.

Application filed May 16, 1878.

*To all whom it may concern:*

Be it known that I, SAMUEL E. GROSS, of Chicago, in the county of Cook and State of Illinois, have invented a new and useful Improvement in Combined Map, Scale, and Index, which improvement is fully set forth in the following specification and accompanying drawings, in which—

Figure 1 is a plan view of one form of my combined map and scale. Fig. 2 is a perspective view of one form of my combined map, scale, and index system.

The object of my invention is to furnish a simple and convenient device and system by which distances, measurements, names, and localities on maps, drawings, and other configurations upon any flexible material can be readily and accurately ascertained; and it consists in printing, placing, or fixing upon or along any of the edges of the reverse side of a flexible map, drawing, or other configuration a scale of miles, the common English or equivalent scale of linear measure, and a number of graduations, figures, and letters, which, either separately or combined, represent and are a scale of distance and measurement upon such map, drawing, or other configuration, together with an index of the localities on the map, with reference figures and letters, so that by folding or bending over the lettered, figured, and graduated edge or edges upon the face of the map, drawing, or other configuration, distances, names, and localities can be determined thereon, substantially in the manner hereinafter more fully set forth.

Referring to the drawings, in Fig. 1, A represents a corner of the reverse side of a flexible map turned or folded over upon the face side thereof, (designated by B,) and so adjusted as to determine the distances between the places thereon (marked $a$, $b$, $c$, and $d$) by means of the scales of distances or graduated edges C and D, drawn to a scale uniform with that of the map, and which can be used as movable scales adjustable between different places thereon to determine distances, measurements, &c. In this figure I have placed the scales on the two edges forming the angle at the lower right-hand corner; but it is evident that they may be placed on any one or more edges or parts thereof of the reverse side of the map, as may be preferred. The subdivisions of the scale may be into inches and fractions of inches, and in that case the number of miles to the inch on the map should be stated. I prefer to denote on the scale adapted to the map, drawing, or other configuration the increasing and accumulative distance or measurement from the starting-point by figures placed beside the graduations at convenient distances.

In Fig. 2 is shown one form of my index method and distance-scale combined. The letter $a$ represents the reverse side of a flexible map, $b$ the face side thereof, and $c$ an index of the names of certain places thereon. In the index $c$ the column of letters upon the right of the column of names refers to similar letters in the index marked $a^2$ upon the edge of the reverse side of the map, and the column of figures refers to similar marginal figures designated by $b'$ at the bottom and top of the face side of the map.

To ascertain the location of any place upon the map, find the name in the index, observe the figure and letter opposite it on the right in the column of figures and letters, and then bend over the graduated edge of the reverse side of the map to the similar figures at the bottom and top of the face side thereof, and opposite or in the vicinity of the similar letter in the index on the edge of the reverse side will be found the place desired—as, for example, to find Oxford on the map, observe in the index $c$, opposite the name "Oxford," the letter and figure E 11; bend over the edge of the reverse side $a$ to the figures 11 at bottom and top $b'$, and opposite the letter E in the graduated edge $a^2$ will be found Oxford. The distance or measuring scale designated at $a'$ can be used, as previously described in Fig. 1, to determine distances, and should be drawn to a scale uniform with that of the map; and, if preferred, the columns of letters in the indexes $c$ and $a^2$ may be dispensed with, and the numbers on the distance-scale $a'$ be used and made to do service in place thereof in the index system.

An additional marginal index corresponding to $a^2$ is designated at $b^2$; but this may be used or not, as may be preferred.

It is apparent that the measuring device and index method for making measurements and discovering localities described and set forth is susceptible of several variations, partly in general design and partly in detail of execution, all of which need not necessarily herein be set forth, as they are essentially but modifications of and dependent upon the device and method herein described.

If desired, the strip designated by $a'$ and $a^2$ may be used thereon either wholly or partly detached from the body of the map, and for determining localities it may be used, instead of solely from top to bottom of the map, diagonally or laterally in connection with reference or index letters or figures at the sides of the map as well.

In manufacturing or constructing the device $a'$ and $a^2$ for or on a map, if more convenient for printing, &c., it may be printed or placed upon and along an edge or edges of the face of the map and the strips containing it bent or folded back and retained along the edges of the reverse side; or the device may be marked or otherwise fixed on a detached strip or strips and these affixed along an edge or edges of the reverse side, so as to present a device similar to one directly marked upon the edges.

Having thus described my invention, what I claim as new, and desire to secure by Letters Patent, is—

1. The map, drawing, or similar device herein described, having an index and scale of distances, or either of them, on the reverse side thereof.

2. As a new and improved article of manufacture, a flexible map, drawing, or similar device with an index of the names of the places or localities designated thereon, each name of a place in the index being accompanied by two numbers or letters, or a letter and number, one of which refers to a similar letter or number on the reverse edge or edges and the other to a similar letter or number on the face edge or edges of the map, drawing, or similar device, as and for the purposes described and set forth.

3. In a map, drawing, or similar device having an index-scale of distances on the reverse side, the combination of the scale $a'$ and the index $a^2$.

4. In a map, drawing, or similar device having an index-scale of distances on the reverse side, the combination of the scale $a'$, the index $c$, and the figured or graduated margins $b'$.

5. In a map, drawing, or similar device having an index-scale of distances on the reverse side, the combination of the indexes $a^2$ and $c$ and the figured or graduated margins $b'$.

6. In a map, drawing, or similar device having an index-scale of distances on the reverse side, the combination of the scale $a'$, the indexes $a^2$ and $c$, and the margins $b'$ and $b^2$.

In testimony that I claim the foregoing I have hereunto set my hand this 21st day of February, A. D. 1878.

SAMUEL E. GROSS.

Witnesses:
J. R. CUSTER,
WM. J. CAMPBELL.